United States Patent

Murakami et al.

[11] Patent Number: 5,904,795
[45] Date of Patent: May 18, 1999

[54] DISC BONDING METHOD AND DEVICE THEREFOR

[75] Inventors: Kazuo Murakami, Kawagoe; Hiroshi Fukutomi, Urawa; Shoei Ebisawa, Konosu, all of Japan

[73] Assignee: Dainippon Ink & Chemicals, Inc., Tokyo, Japan

[21] Appl. No.: 08/689,728

[22] Filed: Aug. 13, 1996

[30] Foreign Application Priority Data

Aug. 15, 1995 [JP] Japan .................................... 7-208055
Nov. 14, 1995 [JP] Japan .................................... 7-295439
May 23, 1996 [JP] Japan .................................... 8-128408

[51] Int. Cl.⁶ .................................................. B32B 31/04
[52] U.S. Cl. .................................... 156/275.5; 156/272.2; 156/275.7; 156/380.9; 156/580
[58] Field of Search .............................. 156/272.2, 272.6, 156/379.6, 380.9, 580, 275.5, 275.7; 369/286; 428/694 R

[56] References Cited

U.S. PATENT DOCUMENTS

| | | |
|---|---|---|
| 3,865,589 | 2/1975 | Freeman et al. . |
| 4,167,669 | 9/1979 | Panico . |
| 4,214,935 | 7/1980 | Nagai .................................... 156/272.2 |
| 4,917,751 | 4/1990 | Ohta et al. . |

FOREIGN PATENT DOCUMENTS

| | | |
|---|---|---|
| 0 189 905 | 8/1986 | European Pat. Off. . |
| 37 34 443 A1 | 4/1989 | Germany . |
| 55-102467 | 8/1980 | Japan . |
| 56-80043 | 7/1981 | Japan . |
| 5608043 | 7/1981 | Japan . |

Primary Examiner—Michael W. Ball
Assistant Examiner—Sam Chuan Yao
Attorney, Agent, or Firm—Armstrong, Westerman, Hattori, McLeland & Naughton

[57] ABSTRACT

The present invention relates to a method for bonding together two disc substrates, at least one disc substrate having a UV transmissive-visible light reflective information recording layer provided on a UV transmissive base. In this method, the disc substrates are bonded together, so that the information recording layer of one disc substrate faces the other disc substrate, by employing UV irradiation to cure a UV curable composition used as a bonding agent. In the case of the present invention, to cure the bonding agent, UV is irradiated in a single or repeating flash so as not to impair the information recording layer. As a result, the bonding agent can be cured in a shorter period of time with less energy consumed as compared to the conventional method of using continuous irradiation of UV light to cure a UV curable composition used as a bonding agent. Accordingly, the present method enables a product disc to be obtained in a shorter time, with less energy used, so that productivity (i.e., number of bondings per unit time) is improved.

20 Claims, 3 Drawing Sheets

DISC BONDING METHOD AND DEVICE THEREFOR

BACKGROUND OF THE INVENTION

1. Field of the Invention

The present invention relates to a method for bonding together two discs having information recording layers and, more specifically, to an optimal method for manufacturing a DVD ("digital video disc" or "digital versatile disc") employing an bonding method.

2. Description of the Related Art

In the conventional method for bonding two plate-like objects together employing a UV curable resin as an bonding agent, a UV curable composition is first coated uniformly to the bonding surfaces of the plates using a known technology such as spin coating, screen printing or the like. The two plates are then stacked so that the bonding surfaces meet. UV light is then irradiated in a continuous emission to cure the resin.

A high-pressure mercury lamp, metal halide lamp, mercury-xenon lamp or other such conventionally used device may be employed as the light source in the UV irradiation. However, since the lamp continuously emits light in this method, heat is readily generated, which can cause warping of the disc or impair its mechanical characteristics.

Further, in these types of continuous emission lamps, it generally requires several minutes or more for the light emission to stabilize once the lamp is turned on. Accordingly, since these lamps cannot be turned on and off readily, the lamp must be left on when a product is being produced continuously. For example, if a production cycle (i.e., the time required for a single bonding process) requires 5 seconds, with UV irradiation carried out for 2 seconds, then energy is wasted during the remaining 3 seconds in which the lamp is on but not needed.

Moreover, when bonding two plate-like objects together using a UV curable resin as an bonding agent, fewer problems occur if at least one of the two plate-like objects is UV transmissive.

However, when manufacturing a product such as a DVD, which is formed by bonding together two plate-shaped disc substrates, a thin metallic layer or other layer which does not readily transmit UV may be present under the bonding layer. In such cases, the intensity of the UV light is significantly weakened by these types of layers, so that efficient curing of the bonding agent may not occur.

Further, if the curing of the bonding agent is to be promoted, it then becomes necessary to provide a large capacity lamp so that the cost of the finished product unavoidably increases. Moreover, if a large capacity lamp is employed, then the heat given off by the lamp presents a problem in that it may give rise to warping or other deformations in the discs. In order to avoid this, it becomes necessary to provide separate cooling equipment around the lamp, making the device larger and more complicated.

Conversely, UV curing may be carried out using a small capacity lamp, but irradiation must then be performed for 20 to 30 seconds or more, making actual application of this approach difficult.

SUMMARY OF THE INVENTION

The present invention was conceived in consideration of the aforementioned problems, and has as its objective the provision of a method and device for bonding discs together which enables a high level of production, uses only a small amount of electric power, and requires only small, lightweight equipment.

After carrying out extensive research aimed at resolving the aforementioned problems, the present inventors were able to complete this invention upon the discovery that a method using flash emissions of UV in UV irradiation, rather than continuously emitting UV, enables a reduction in the electric power consumed and an increase in the number of discs bonded over a given period of time.

In other words, a first aspect of the present invention concerns a method for bonding together two disc substrates, each of which has a UV transmissive base, at least one disc substrate having a UV transmissive-visible light reflective information recording layer provided on the UV transmissive base, wherein the disc substrates are bonded together, so that the information recording layer of one disc substrate faces the other disc substrate, by irradiating UV light to cure a UV curable composition employed as a bonding agent, this method being characterized in that curing of the bonding agent is carried out by flash irradiation of UV light.

The second aspect of the present invention concerns a device for bonding together two disc substrates, each of which has a UV transmissive base, at least one disc substrate having a UV transmissive-visible light reflective information recording layer provided on the UV transmissive base, wherein the disc substrates are bonded together, so that the information recording layer of one disc substrate faces the other disc substrate, by irradiating UV to cure a UV curable composition employed as a bonding agent, this device being characterized in the employment of a light emission device which includes a flash-type discharge mechanism and a lamp that serves as the UV light source.

At least one of the two disc substrates employed in the bonding process in the present invention has an information recording layer provided on a UV transmissive base. The present invention includes both the case where each of the disc substrates have an information recording layer provided on a UV transmissive base, and the case where one disc substrate has an information recording layer provided on a UV transmissive base while the other disc substrate does not have an information recording layer which requires a UV transmissive base. In other words, the phrase "two disc substrates, at least one disc substrate having a UV transmissive-visible light reflective information recording layer provided on a UV transmissive base" as used in the present invention is intended to include both of the preceding cases. In either case, however, the UV transmissive layer ordinarily has a thickness of 0.3 to 1 mm.

Any of the known materials conventionally used may be employed as the UV transmissive base, with examples including heat-resistant thermoplastic synthetic resins such as acrylic resin, polycarbonate, amorphous polyolefin or the like. The information recording layer is provided to one of the bases, and has pits or indentations representing recorded information. This information recording layer is laminated with a UV transmissive-visible light reflective coating.

It is preferable that the material used for this coating is one which permits accurate confirmation of the pits by reflecting at a high rate the visible light used to read out the recorded information. In general, a coating which reflects visible light at a high rate will also demonstrate a high rate of reflection for UV light as well. A coating which does not transmit UV at all cannot be employed in the present invention. Examples of a UV transmissive-visible light reflective coating include UV-transmissive visible light-reflective metals such as aluminum, nickel, gold or alloys. Metals which may be employed as this coating are ones which have a rate of reflection of visible light in the range of 80 to 100%, and a rate of transmission of UV that is in the range of 0 to less than 10%, but preferably above 0 and less than 3%, across the entire UV wavelength region. The thickness of this coating in the information recording layer is between 200 to 800 angstroms.

The disc substrate employed in the present invention may be obtained by pouring the material which is to form the substrate into a stamper mold in which grooves of a specific size, thickness and shape have been formed which correspond to the audio or video information which is to be regenerated. The substrate is then molded, and a UV transmissive-visible light reflective coating is then laminated over the substrate. In general, this laminate can be formed by depositing the aforementioned metal to a specific thickness on the pitted surface of the substrate to form a thin metallic coating. In this way, an information recording layer may be formed in which the pits and coating are formed in a unitary construction.

In order to extend the recording time, distinct or continuous information may be recorded in the information recording layers of each of the two disc substrates which are bonded together to form a DVD, for example.

A known UV curable composition conventionally used may be employed as the bonding agent for bonding the disc substrates. Such UV curable compositions are also referred to as UV curable resins. With a view toward improving the UV curing characteristics, it is preferable to employ a UV curable composition which includes a photopolymerization initiator. In this case, it is preferable to use a photopolymerization initiator which has an absorption wavelength which at least overlaps the wavelength of the irradiated UV light, as described below. By using such a photopolymerization initiator, curing and bonding can be carried out with greater efficiency and certainty.

When formulating a UV curable composition, monofunctional (meth)acrylate and polyfunctional (meth)acrylate may be used as the polymerizable monomer component. One or two or more types of each of these may be used. In view of curing and contraction, and the bonding characteristics, it is preferable to use monofunctional (meth)acrylate as the main agent in combination with polyfunctional (meth)acrylate.

The photopolymerization initiator is not particularly limited, provided that it is one which generates a radical upon exposure to light, and that this radical reacts efficiently with the aforementioned (meth)acrylate composing the composition. Such types of photopolymerization initiators include ones which generate a radical upon cleavage of the molecule, and ones which are used in a composite such as the combination of an aromatic ketone and a hydrogen donor.

Examples of photopolymerization initiators which generate a radical upon cleavage of the molecule include benzoyl ethyl ether, benzoin isobutyl ether, benzyl dimethyl ketal, 1-hydroxycyclohexyl phenyl ketone, 2-hydroxy-2-methyl-1-phenylpropan-1-one, 2,4,6-trimethylbenzoyldiphenylphosphine oxide, 1-(4-isopropylphenyl)-2-hydroxy-2-methylpropan-1-one, and 2-methyl-1-(4-methylthiophenyl)-2-morpholinopropan-1-one, and the like.

Aromatic ketones exemplifying photopolymerization initiators which are used in a composite include benzophenone, 4-phenylbenzophenone, isophthalophenone, 4-benzoyl-4'-methyldiphenyl sulfide, 2,4-diethylthioxanthone, 2-isopropylthioxanthone, and 2-chlorothioxanthone. Examples of hydrogen donors which are used in combination with the aforementioned include mercaptan compounds, amine compounds and the like. In general, however, amine type compounds are preferable.

Examples of amine type compounds include triethylamine, methyldiethanolamine, triethanolamine, diethylaminoethyl (meth)acrylate, p-dimethylaminoacetophenone, ethyl p-dimethylaminobenzoate, isoamyl p-dimethylaminobenzoate, N,N-dimethylbenzylamine, and 4,4'-bis(diethylamino)benzophenone, and the like.

It is preferable that the UV curable composition be one which is in a liquid state at temperatures ranging from room temperature to 40° C. It is preferable that a solvent not be employed, or to restrict the use thereof to an extremely small amount. Further, when carrying out coating of the composition using a spin coater, it is preferable that formulation be carried out so that the viscosity is in the range of 500 to 1000 centipoise, so that a comparatively thick coating can be achieved.

The product disc obtained by bonding two disc substrates together is readily subject to warping and deformation in each of its disc substrates, making it difficult to obtain a bonding layer and a bonded product disc of uniform thickness across the entire surface thereof. However, by using a disc holding member which has an extremely small degree of surface roughness and an extremely low degree of profile irregularity together with a vacuum-suction element to hold each disc substrate, the particular deformation or warping in each plastic disc substrate can be forcibly corrected by the disc holding member. Thus, deformation or warping in the disc can be corrected more precisely as compared to the case where a disc holding member and vacuum-suction element are not employed. Further, the bonding layer between the two disc substrates, which is filled with the UV curable composition, becomes subject to a temporary viscous adhesive force from the UV curable composition, even prior to irradiation with UV. In this case, even if the disc holding member is released, each of the disc substrates will remain in their corrected state for a period of time due to this temporary viscous adhesive force. Accordingly, by carrying out UV irradiation soon after release of the disc holding member, with the disc substrates corrected of any warping or deformation, it is possible to obtain a bonding layer and product disc of uniform thickness across the entire surface thereof.

Where employing a UV transmissive disc holding member which has extremely small surface roughness and an extremely low degree of profile irregularity, and which has a vacuum-suction element, it is possible to obtain a bonding layer and product disc of uniform thickness across the entire surface thereof, with the fine degree of correction in the individual disc substrates that was imposed by the disc holding member maintained even when the holding member is released.

Alternatively, in the case where at least one of two disc substrates, in which one or both disc substrates have a UV transmissive-visible light reflective information recording layer provided on a UV transmissive plastic base, is coated with a UV curable composition employed as the bonding agent, and curing and bonding are carried out under UV irradiation with the information recording layer facing inward, to bond together the two disc substrates, the following method is available. Namely, both of the disc substrates are held with a disc holding member which has a vacuum-suction element and has a surface roughness of Rmax≦1 μm and profile irregularity of less than or equal to 7 λ (λ=5460 angstroms) measured according to Japanese Industrial Standard (JIS) B0601. One of the disc substrates is then pressed on top of the other disc substrate so that the bonding layer becomes a constant thickness. The holding member is then released, and the two disc substrates are bonded together by curing the bonding agent under UV irradiation.

Alternatively, where bonding two disc substrates in which one or both disc substrates have a UV transmissive-visible light reflective information recording layer provided on a UV transmissive plastic base, by employing a UV curable composition as an bonding agent, coating the UV curable composition to at least one of the two disc substrates, and curing the composition under UV irradiation with the disc substrate's recording layer facing inward, the following method is available. Namely, the disc substrates are held by UV transmissive disc holding members which are provided with a vacuum-suction element and have a surface roughness of Rmax≦1 μm and a profile irregularity of less than or equal to 7λ (λ=5460 angstroms) measured according to Japanese Industrial Standard (JIS) B0601. One of the disc substrates is then pressed onto the other disc substrate so that the bonding layer reaches a constant thickness, and the two disc substrates are then bonded together by curing the bonding agent under UV irradiation.

Because the member for holding stacked disc substrates is provided with a vacuum-suction element and has an extremely low surface roughness and profile irregularity, the particular warping and deformations in the plastic disc substrates can be forcibly corrected, with the two disc substrates pressed together so that the thickness of the bonding layer therebetween becomes constant. Since curing with UV can then be carried out with the disc substrates stacked in this extremely precise configuration, warping, bending and changes in the mechanical strength of the product disc can be reduced. Thus, the yield of product discs in which the bonding layer and the product disc itself are of constant thickness across the entire surface thereof can be increased.

It is preferable to employ a liquid UV curable composition which has high viscous adhesive characteristics even prior to UV irradiation. This is because the enforced correction of warping, etc., in the disc substrates can be maintained for a longer period of time after release of the disc holding member prior to UV irradiation, due to the temporary viscous adhesive force of the composition. Thus, the length of time until UV irradiation may be extended.

In order to coat a fixed quantity of the UV curable composition accurately, a high precision quantitative liquid feeder may be employed which is provided with a function to compensate for deviations in the discharge amount due to the difference in water head inside the composition tank, or which is provided with an automatic vacuum compensator for preventing mixing in of bubbles and liquid run. Such types of high precision quantitative liquid feeders include those manufactured by Musashi Engineering Co., or the US company EFD.

The UV curable composition may be coated over the entire disc substrate surface where bonding is necessary, or may be applied to a small area and then spread over the entire surface. The bonding agent may be applied in the shape of a ring concentric around the center axis of the disc substrate. One disc substrate may then be fixed in place levelly with the bonding surface directed upward, while the other disc substrate is placed on top of the first disc substrate and pressed down onto it so that the center axes of each disc substrate are aligned. As this is being done, the bonding agent applied in the shape of a ring gradually spreads over the entire surface of the disc substrate. UV irradiation is then carried out. In this case, the following relationship can be employed.

$$\frac{\text{vol. of bonding agent}}{\text{surface area of bonding surface}} = \text{thickness of bonding agent layer}$$

The thickness of the bonding layer following curing can be obtained based on this relationship and on the rate of contraction of the bonding agent upon curing.

When coating a UV curable composition using a high precision quantitative liquid feeder, it is preferable to adjust the viscosity of the composition (resin) to be in the range of 3,000 to 20,000 cps. When the viscosity is in this range, the discharged bonding agent maintains its shape (i.e., application in the form of a ring, etc.) over a period of time, even if the disc substrate is inverted. Further, a UV curable composition in this viscosity range will not spread more than necessary prior to stacking of the disc substrates, but at the same time is not so difficult to spread that an portion of the disc substrate surface does not become coated. It is preferable to apply the bonding agent in the shape of ring on the bonding surface of the disc substrate.

The bonding agent may be applied to the bonding surface of just one disc substrate in the shape of a ring concentric about the disc substrate center, or may be applied to the bonding surfaces of both disc substrates in the shape of a ring concentric about the disc substrate centers.

Bubbles may occur when spreading the UV curable composition across the entire surface of the disc substrate. However, this may be almost entirely eliminated by lowering the upper disc substrate gradually until the respective ring shaped applications of the UV curable bonding agent spread across the entire surface, and the disc substrates meet.

By forcibly correcting warping, etc. in the disc substrates using disc holding members provided with a vacuum-suction element and having extremely low surface roughness and profile irregularity, a constant thickness can be achieved for the bonding layer and the product disc across the entire surface area thereof.

Any known conventionally used material may be employed for the disc holding member, examples including metals such as stainless steel, aluminum, and titanium, plastics such as polyphenylene sulfide and aromatic polyimides, and glass. When using a material which does not have the aforementioned specific surface roughness and profile irregularity, the material may be used after mirror-finishing the surface. Further, it is preferable that a UV transmissive material be employed for both the aforementioned material and the disc holding member itself.

A smaller absolute value for the surface roughness and profile irregularity of the disc holding member is more preferable. Where obtaining a disc holding member in which the surface roughness is Rmax=1 μm and profile irregularity=7 λ (λ=5460 angstroms) measured according to Japanese Industrial Standard (JIS) B0601, metals or glass are preferable from among the aforementioned materials as their surfaces may be readily mirror-finished to these values. Glass, however, is even more preferable than metal, as its surface can be mirror-finished to a surface roughness of Rmax≦0.05 μm and a profile irregularity of less than or equal to 1 λ (λ=5460 angstroms) measured according to Japanese Industrial Standard (JIS) B0601.

If the thickness of the bonding layer is determined by the volume of the bonding agent used and the surface roughness and profile irregularity of the disc holding members, then it is possible to extremely accurately control the pressing force applied on the disc substrates. However, a simpler method providing the same effects as the method described above employs for at least one of the disc holding members, a disc holding member which has a spacer which controls the thickness of the stacked disc substrates so that the thickness is constant across the entire surface of the disc substrate, this disc holding member provided with a vacuum suction element and having a surface roughness of Rmax=1 $\mu$m and profile irregularity=7 $\lambda$ ($\lambda$=5460 angstroms) measured according to Japanese Industrial Standard (JIS) B0601.

There are no particular limitations applied to the stacking of the two disc substrates by the disc holding members prior to bonding. For example, the disc substrates may be positioned so that the bonding surfaces face one another, with the upper disc substrate lowered onto and pressed against the lower disc substrate which is held immobile. Conversely, the upper disc substrate may be held in place while the lower disc substrate is raised up and pressed against it. Alternatively, the lower disc substrate may be raised while the upper disc substrate is lowered until they meet and are pressed together.

Such operations as releasing the disc holding member, removing all or a portion of the member, and the like, prior to curing a UV curable bonding agent, which must be carried out in the case of a disc holding member which is not UV transmissive, are not necessary when the disc holding member permits the passage of UV light therethrough. Thus, the bonding operation per unit time is improved, and the need for a special mechanism to remove the holding member is eliminated. Accordingly, the device used in the manufacturing process requires fewer parts as compared to conventional devices, and thus can be made more compact.

When a disc substrate has a very high degree of warping or deformation, it may return to this original shape under its own restorative force once the disc holding member is released. Accordingly, it may be difficult in this case to bond the disc substrates with there corrected configuration maintained.

Thus, in the case of a disc holding member which does not transmit UV light, it is effective to employ such methods as immediately carrying out UV irradiation upon release of the holding member, using a UV curable composition which has a high viscous adhesive force at the bonding surfaces of the disc substrates even prior to UV irradiation, and the like. In contrast, when using a UV transmissive disc holding member, the disc holding member does not have to be released prior to UV irradiation, so that the amount of time elapsed from stacking of the disc substrates to UV irradiation is not a concern.

When using disc holding members which do not transmit UV light, then at least one of the holding members is released and UV irradiation is carried out from the side of that surface.

It is preferable that the disc holding member be UV transmissive, and even more preferably that it be formed of a UV transmissive material which transmits UV light of the wavelength needed to cure the bonding agent at as high a rate as possible (preferably 100%). Glass is suitably used as this material, with a UV transmissive disc holding member made of quartz glass being preferable. The upper and lower disc holding members both have vacuum-suction elements which are employed for holding the disc substrates.

A vacuum pump and a plate-shaped disc holding member in which a plurality of holes or grooves have been formed in at least one surface may be employed for the vacuum-suction element, for example. In this case, using the vacuum pump, a low pressure state is induced on one surface of the disc substrate by suctioning air up via these holes or grooves. The disc substrate is thus held fixedly under this suction force. It is, of course, more convenient to connect the holes or grooves so that air may be drawn up through a single suction opening. In this case, the greater the degree of low pressure, the more sufficiently the disc substrate can be held in a fixed position. Once bonding of the disc substrates has been completed, the air suction terminates and the suction holes or grooves return to a normal pressure state. The bonded disc substrates can then be released and separated from the holding member.

When holding the two disc substrates, it is permissible to use a disc holding member equipped with a vacuum-suction element that is UV transmissive for one disc substrate, and a disc holding member equipped with a vacuum-suction element that is not UV transmissive for the other disc substrate. However, when carrying out UV irradiation from the outer surfaces of both disc substrates, UV transmissive disc holding members are preferably employed for the holding of both disc substrates.

Additionally, in the case of bonding together one disc substrate which has an information recording layer provided on a UV transmissive base and another disc substrate which does not have an information recording layer requiring a UV transmissive base, where bonding thus occurs between a base and an information recording layer, UV irradiation is generally carried out only from the side of the substrate which does not have an information recording layer. The disc substrate surface having the information recording layer may then be held with the non UV-transmissive disc holding member. In this case as well, however, it is of course permissible to employ UV transmissive disc holding members for both disc substrates.

In the present invention, in the case where both of the disc substrates have an information recording layer provided on a UV transmissive base, the disc substrates are bonded together with their information recording layers facing one another. The information recording layers having exposed UV transmissive-visible light reflective coatings as described above may be directly bonded together, or a protective coating for protecting the exposed surface of the metallic coatings may be provided to one or both of the recording layers, with these protective coating layers then bonded together. This protective layer is also generally formed of a UV curable composition, and must be UV transmissive. The UV curable composition used for the protective coating is preferably formulated to have excellent bonding character for both the UV transmissive-visible light reflective coating and the cured UV curable composition. Of course, the preceding also applies to the case where one disc substrate has an information recording layer on a UV transmissive base while the other disc substrate does not have an information recording layer which requires a UV transmissive base, and bonding is thus carried out between an information recording layer and a base.

The present invention is characterized in that curing of the UV curable composition is carried out by flash irradiation of UV light. A single flash is acceptable, but a design which adjusts the duration of a single bonding cycle to be 3 to 15 seconds in length is preferable.

When carrying out flash irradiation with UV light, a light generating device including a lamp as a UV light source and a flash-type discharge mechanism may be employed, as in the second aspect of the present invention.

The UV light source employed in the present invention may be typified by a device which can repeatedly generate flashes of UV light. A xenon lamp, mercury-xenon lamp, metal halide lamp or the like may be employed for the lamp. Additionally, it is preferable to employ a lamp which has excellent durability with respect to the repeated generation of light.

A circuit which connects in series to a capacitor for storing charge, the lamp electrodes, and the coil for controlling the current waveform during discharge may be employed for the flash-type discharge mechanism which causes flashing of the lamp.

The capacitor may be charged using a circuit in which an element connected in series to a direct current voltage source and a resistor for controlling the charging current is connected in parallel to the capacitor. In order to discharge the charge stored in the capacitor to the lamp, a supplementary electrode in the form of a wire wrapped several times around the lamp may be provided, with a trigger generating circuit used to impress a high voltage pulse between the supplementary electrode and one of the lamp's electrode.

Dielectric breakdown of the gas inside the lamp then occurs instantly with the impression of a high voltage pulse. This becomes a trigger, with the electric energy stored in the capacitor discharged inside the lamp within an extremely short time t, to release an intense flash.

The electric energy is discharged during an extremely short time t which is on the order of micro to milliseconds. For this reason, the voltage between both electrodes of the lamp falls sharply with the start of discharge, so that discharge ends immediately.

Further, the following mechanism can be employed to carry out repeated flashing of the lamp. In the discharge accompanying the flash, charging of the capacitor from the direct current voltage source begins at almost the same time as the termination of discharge. The time required for charging is related to the time constant $\tau$ which is determined from the product of the capacity (farads) of the capacitor and the resistance (ohm) for controlling the charging current. In general, when the relationship between the time constant $\tau$ and the discharge time t is $\tau \gg t$, then the generation of light through electric discharge does not become continuous, but concludes as a single generation. However, charging is subsequently carried out continuously.

When charging of the capacitor becomes saturated to a certain level where electric discharge is again possible, a high voltage pulse is again impressed. When this happens, the second flash is generated. Repeated flashing of the light can be carried out by the above described operation.

Irradiation with flashing UV light may be carried out at one surface of the disc substrate, or at both surfaces of the disc substrate. However, when bonding is between an information recording layer side and a base side in the case where one disc substrate has an information recording layer provided on a UV transmissive base while the other disc substrate does not have an information recording layer which requires a UV transmissive base, then UV irradiation is generally carried out only at the surface of the disc substrate which does not have the information recording layer. However, irradiation may also be carried out at both this surface and at the surface of the disc substrate which has the information recording layer.

In the case where one disc substrate has an information recording layer provided on a UV transmissive base while the other disc substrate does not have an information recording layer which requires a UV transmissive base, such that bonding is between an information recording layer side and a base side, with UV irradiation carried out only at the surface of the disc substrate which does not have the information recording layer, a comparison between a flash-type irradiation of UV light and continuous UV irradiation reveals that the former consumes less electric power and provides a higher rate of productivity.

Where disposing a plurality of lamps, whether in the case of irradiating from the side of one or from the sides of both disc substrates, it is preferable to synchronize the flashing of the lamps in the UV irradiation as this produces a more efficient curing of the UV curable composition than in the case where flashing of the lamps is not synchronized.

In the case where infrared light is included in the light from the light source when carrying out a flash-type UV irradiation, it is preferable to block the infrared light and irradiate with UV only. In this way, infrared irradiation of the disc substrate is avoided, and deformation or warping of the disc due to heat from the infrared light does not readily occur.

An ordinary infrared blocking filter may be employed when selectively blocking infrared light from the light rays generated from a light source lamp for generating UV light.

Through the discovery of the present inventors, it was understood that even if the same energy was discharged each cycle, the intensity of the light emitted from the lamp or the spectral distribution changes if the peak value of the discharge current or the time duration is changed, so that the curing characteristics of identical UV curable compositions may vary. On the other hand, in the case of a thin metal coating of aluminum, nickel or the like, the spectral distribution and the intensity of the light transmitted will be different depending upon the material, its thickness, etc.

In the device according to the present invention, in order to bond various types of disc substrates using flash-type UV irradiation under identical processing conditions, it is preferable that the device have a mechanism for varying such circuit constants as charging voltage applied to the discharge circuit, capacitor capacity, inductance and the like, in response to the light transmissive characteristics and the thickness of the UV transmissive-visible light reflective coating used in the disc substrate. In this way, it becomes possible to suitably adjust the time duration and the peak value of the discharge current for each type of disc substrate using a single light generating device, so that efficient curing of the bonding agent under UV irradiation can be achieved.

In a flash-type irradiation, light in the infrared region is irradiated along with the intense UV light emitted from the lamp at the time of light generation. This infrared light, which may comprise a particularly large proportion of the light irradiated toward the disc substrate, readily transmits heat to an object. However, if a material which readily transmits light, such as polycarbonate, is employed for the substrate material, there is almost no occurrence of deformation by heat, even in the case of this type of intense flash. Thus, damage to the surface of the disc substrates is almost entirely absent.

However, in the case where a sputtered layer in which the material is aluminum or the like, which has a low degree of light transmissivity, is provided to the substrate, the majority of the light energy during the flash irradiation is returned to the lamp from the sputtered coating. When this occurs, the peak power of the flash becomes too strong, and may damage the aluminum layer, causing it to change color, in the case where the distance between the lamp and the disc substrate is too short.

In order not to impair the reliability of the information engraved in the pits of the information recording layer due to flash-type irradiation, it is preferable to suitably adjust the waveform of the discharge current and the distance between the lamp and the disc substrate.

In this way, the product disc formed by bonding together two disc substrates can be scanned and irradiated with visible light rays from a semiconductor laser to replay the information recorded on the information recording surface. As a result, the recorded information can be converted to sound of visual images, for example, for the user's enjoyment.

By employing a UV light source lamp and a flash-type discharge mechanism in the above described present invention, the curing reaction of the UV curable composition can be carried out to complete the bonding process within a shorter period of time than required in conventional methods and devices, even when the equipment has a lower electric capacity. Thus, it is possible to realize a production process for bonded discs at low cost. Further, if a mechanism for suitably adjusting the discharge current waveform in response to the light transmitting characteristics of the disc substrate is provided, then UV irradiation can be carried out with even greater efficiency.

The first aspect of the present invention relates to a method for obtaining a single product disc by bonding together two disc substrates. At least one of these two disc substrates has a UV transmissive-visible light reflective information recording layer provided on a UV transmissive base. When bonding this disc substrate with another disc substrate which may have the same or different layer structure, a bonding agent consisting of a UV curable composition is employed with a flash-type UV irradiation carried out. As a result, the product disc can be obtained in a shorter period of time with less energy consumed as compared to the conventional technique of carrying out continuous UV irradiation. Further, the number of bondings per interval of time (i.e., the productivity) can be improved.

In the second aspect of the present invention, by providing a non-conventional flash-type discharge mechanism when exercising the method according to the first aspect of the present invention, it becomes possible to carry out a flash-type irradiation of UV light. As a result, it becomes possible to obtain a product disc in a shorter period of time with less energy consumed, while increasing the number of bondings per interval of time, as compared to the conventional technique of carrying out continuous UV irradiation. An additional advantage is also obtained, however, in that the device can be made smaller and lighter in weight.

DESCRIPTION OF THE PREFERRED EMBODIMENTS

Figure 1:
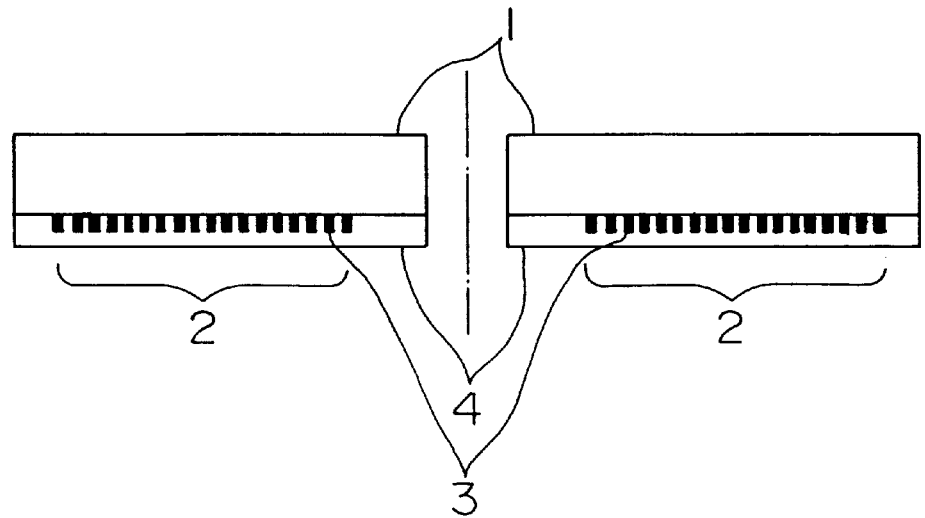
FIG. 1 is a view in cross-section of one of the disc substrates prior to bonding which form a DVD which is manufactured using a bonding method.

Preferred embodiments of the present invention will now be explained.

First, a thermoplastic resin having excellent heat resistance is melted and poured into a stamper in which pits corresponding to recorded information have been carved in a circular direction. The melted resin is cooled to obtain a circular disc substrate engraved with pits.

Next, a metal is sputter-deposited on the surface engraved with pits to a constant thickness, to form a thin coating which will reflect visible light at a high rate for regeneration but is almost entirely non-transmissive to UV. A liquid UV curable resin which can form a cured material which is highly transmissive to UV and has excellent adhesive characteristics with respect to metal is coated onto the thin metal coating to form a smooth surface, completely filling the irregularities in the metallic coating which are caused by the aforementioned pits and the like. UV irradiation is then carried out to cure the composition, forming the protective coating layer. However, when the protective coating layer is not necessary from the prospective of the quality of the product, it may be omitted. An even number of at least two or more of these disc substrates are prepared.

The information recording layer of one disc substrate is directed upward, and a liquid UV curable composition is dripped onto the disc substrate surface, this liquid UV curable composition able to form a cured matter which has excellent adhesive characteristics with respect to the information recording layer and including a photopolymerization initiator which has an absorption wavelength which overlaps with the wavelength of the UV light which is irradiated in flashes as explained below. Spin coating is then carried out so that the UV curable composition forms a coating of a specific thickness.

Before the composition is cured, another disc substrate is stacked on top of the first disc substrate so that its protective coating surface faces the surface of the first disc substrate which was coated with the UV curable composition. In order to sufficiently adhere the bonding agent and both protective coating layers, a weight which transmits UV light is applied.

The bonding agent may consist essentially of the UV composition or it may additionally contain other ingredients. The bonding agent is also called an "adhesive" in this technical field.

According to the present invention, the bonding of two disc substrates includes the following five types:

|  | Type 1 | Type 2 | Type 3 | Type 4 | Type 5 |
|---|---|---|---|---|---|
| Disc Substrate 1 | UVTB IRL | UVTB IRL | UVTB IRL PL | UVTB IRL | UVTB IRL PL |
|  | Adhesive | Adhesive | Adhesive | Adhesive | Adhesive |
| Disc Substrate 2 | IRL UVTB | PL IRL UVTB | IRL UVTB | UVTB | UVTB |

UVTB: UV Transmissive Base
IRL: Information Recording Layer
PL: Protective Layer A UV light source lamp containing gas is connected to the flash-type discharge circuit obtained based on the circuit shown in FIG. 3. A supplementary electrode connected to a trigger generating circuit is provided around the lamp. If a design is provided which allows the total capacity of the direct current voltage source, charging capacitor, resistor for controlling the charging current, and capacitor to be varied by changing a switch, then conditions for curing the UV curable composition in disc bonding, such as the peak value of the waveform of the discharge current, the time duration for the waveform to reach ⅓ of this peak value, the repeat speed of the lamp flash, etc., can be optimized by operating the device.

When the lamp is a non-directional light source, a hood provided with a UV reflective coating is provided around the lamp to orient the direction of the light rays from the lamp which are directed at the surface which is to be cured, while an infrared blocking filter is provided in the light ray path so that only UV light is selected to irradiate the surface to be cured.

The emission spectrum of the flash-type UV is selected so that the transmissivity of the thin metallic coating is as high as possible, the photopolymerization initiator included in the curable composition reacts strongly to the UV light passing through the metallic coating, and the UV light and the absorption wavelength overlap in as many regions as possible. In this way, UV light is irradiated in flashes according to the conductance from the supplementary electrode which is connected to the trigger generating circuit.

Although modes of disc bonding methods and devices therefor are explained in the above, the following modes are also included in the present invention:

(1) a method for producing a product DVD in which two disc substrates are bonded together, each disc substrate having a UV transmissive base, at least one disc substrate having a UV transmissive-visible light reflective information recording layer provided on the UV transmissive base, by using a bonding agent containing a UV curable composition between the disc substrates, the information recording layer of one disc substrate facing the other disc substrate, and by curing the bonding agent by UV irradiation, wherein the bonding agent is cured by a single or repeating flash of UV light so as not to impair the information recording surface, with the energy consumed being less and the irradiation time being shorter than is required in the case of curing a UV curable composition using a continuous emission of UV light; and (2) a product DVD obtained by the method as recited in the first aspect of the present invention.

EXAMPLES

Example 1

Preferred embodiments of the present invention will now be explained in detail using the figures. FIG. 1 is a view in cross-section of one of the disc substrates for a DVD standard which is manufactured using a bonding method. The numeral 1 indicates a polycarbonate resin base; 2 is a surface for recording information; 3 is an aluminum sputtered coating which has a transmissivity rate of about 3% at a wavelength of 365 nm; 4 is a protective coating consisting of a cured UV curable composition (resin) which is UV transmissive and has an excellent sealing character with aluminum and with the bonding agent which is used for bonding the disc substrates as explained below. Additionally, the line in the center of FIG. 1 indicates the center axis of rotation of the disc substrate.

There are various types of discs under the DVD standard. For example, a type of disc known as SD-10 (DVD-10) is produced by bonding together the two disc substrates shown in FIG. 1 so that their information recording layers face one another. In the SD-5 (DVD-5), one disc substrate as shown in FIG. 1 and another disc substrate which is transparent and is of the same shape and material but which is not provided with an information recording layer are bonded together with the information recording layer of the first disc substrate facing inward. The present invention includes both the SD-10 (DVD-10) and SD-5 (DVD-5) types. However, in the following explanation, the bonding of disc substrates for an SD-10 (DVD-10) will be used for illustration.

Figure 2:
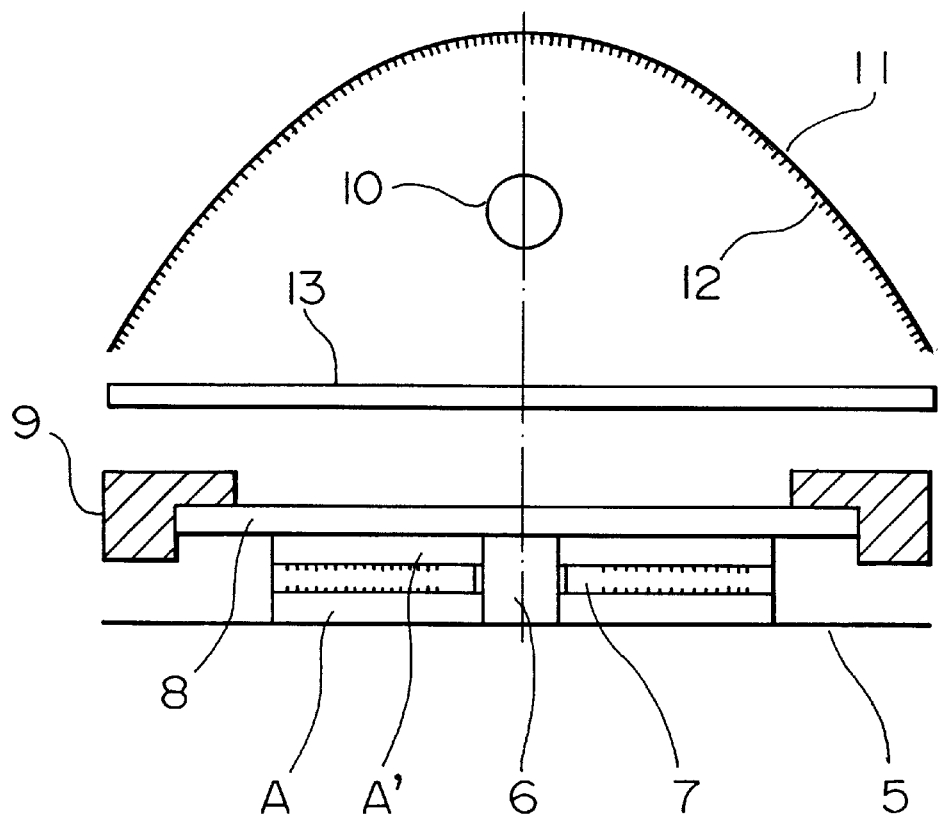
FIG. 2 is a view in cross-section of one embodiment of the disc bonding device.

An explanation will now be made of the device employing the present invention. FIG. 2 is a view in cross-section of the outside of this device. The numeral 5 indicates an extremely flat pedestal for fixing the disc substrate in place, while 6 is an axis shaft for matching the centers of the two disc substrates. As in FIG. 1, the line in the center of FIG. 2 indicates the center axis of rotation of the disc. The numeral 7 indicates an uncured layer of UV curable composition SD-1700 (manufactured by Dainippon Ink and Chemicals, Inc.) which is employed as the bonding agent and has been coated using a spin coating method. In FIG. 2, SD-1700 is coating only to the protective layer of disc substrate A (lower disc substrate) shown in FIG. 1, with the disc substrates stacked so that the protective layer of disc substrate A' (upper disc substrate) and the protective layer of disc substrate A come in contact.

In FIG. 2, the numeral 8 indicates a quartz glass disc for applying a uniform load so that the two stacked disc substrates will adhere together well, while 9 is an aluminum weight of approximately 2 kg provided for adjusting the load.

Numeral 10 indicates a long cylindrical xenon lamp (manufactured by Ushio Inc.) with a tube diameter of 10 mm and an effective light-emitting length of around 300 mm. Numeral 11 is a hood having a parabola-shaped reflective surface which is provided for efficiently irradiating the disc surface with the light flashes. Numeral 12 is a reflective coating provided inside the hood which transmits infrared but reflects UV well. Numeral 13 is an infrared blocking filter which blocks the infrared component of the light flashes. This filter prevents light from the infrared region, which has considerable heat generating effect, from heating the disc, causing deformations, etc.

Although not shown in FIG. 2, a supplementary electrode in the form of a wire is provided along the length of lamp 10 which is at the front of FIG. 2. One electrode which is provided at the front end of lamp 10, one which is provided at the back end of lamp 10, and this supplementary electrode are connected to a flash-type discharge mechanism.

Figure 3:
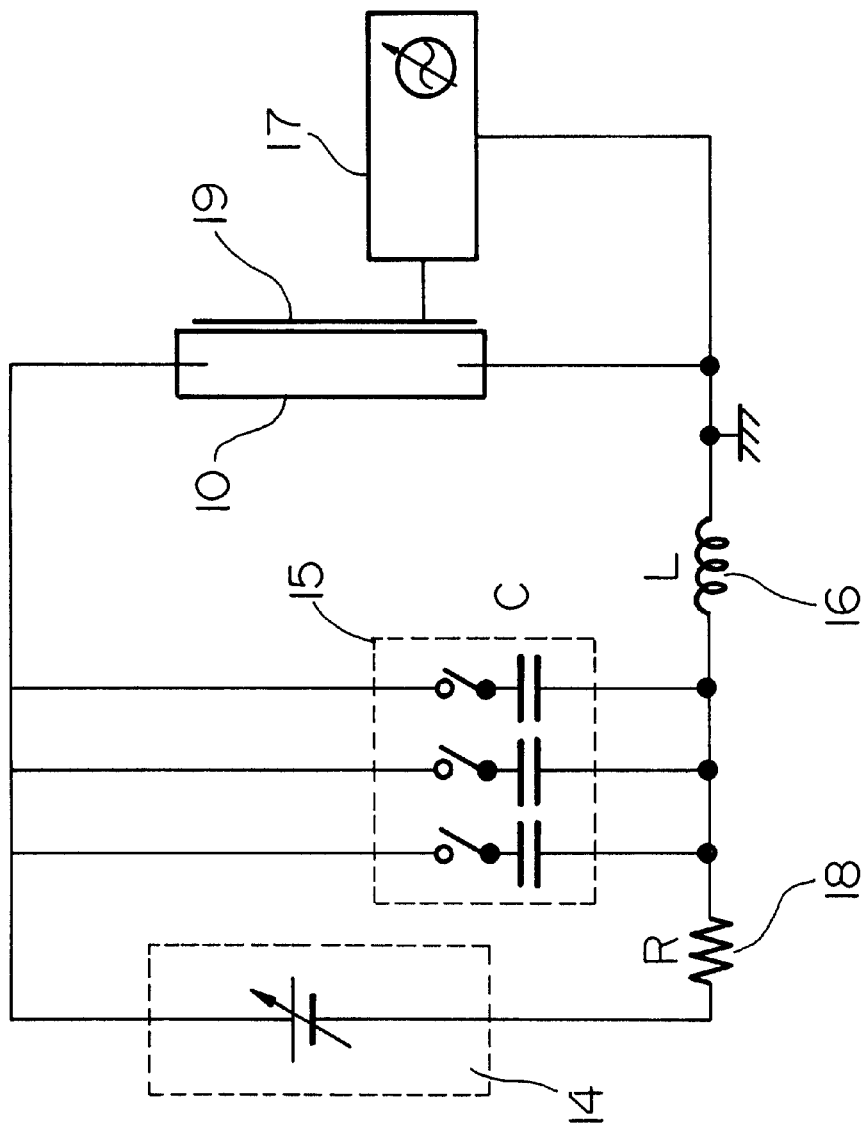
FIG. 3 is a schematic figure showing the power circuit for supplying electric power to the xenon lamp.

FIG. 3 shows a basic power circuit for supplying power to the xenon lamp, causing it to generate light. In the figure, numeral 14 indicates a direct current power source for charging; numeral 15 indicates a capacitor C for charging for which the total capacitance can be varied by changing a switch; numeral 16 is an air coil having reactance L provided for adjusting the waveform of the discharge; and numeral 17 is a repeating trigger generation circuit. The output terminal for repeating trigger generation circuit 17 is connected to the supplementary electrode which is directly wrapped several times around the xenon lamp (the line which is drawn parallel to lamp 10 in the figure is a convenient representation to indicate the supplementary electrode).

By setting the reactance L of the air coil to 30 $\mu$H, the charging voltage to 1.8 kV, the capacitance to 300 $\mu$F, and the repeating speed of the flash discharges to 1 cycle/sec, uncured layer 7 could be completely cured under UV irradiation for 7 seconds.

The energy used in this case was 3.4 kWs (3,400 joules). In order to obtain about the same degree of curing using the conventional continuous irradiating-type UV irradiation device, it is necessary, for example, to employ a metal halide lamp with an installation capacity of 3 kW, with the disc substrates placed on a conveyor and passed under the lamp at a distance at which the disc substrates will not be deformed due to heating by the lamp. About 15 seconds are required in this case, with the 45 kWs (45,000 joules) of energy being consumed. In other words, as compared to continuous UV irradiation, a flash-type irradiation enables two disc substrates to be bonded together with less energy consumed.

The discharge energy per cycle calculated under the aforementioned conditions was 486 J, while the peak value of the waveform of the discharge current was about 1,050 A. The time duration for the waveform to reach one third of its peak value, peak, and then again fall to one third of its peak value (hereinafter, referred to as "one-third-falling duration") was about 0.4 msec. Under the aforementioned conditions, the power consumed in terms of power capacity did not even amount to 1 kW, even when taking the voltage conversion efficiency and the power factor of the electric circuit system into consideration.

In the above described embodiment, two disc substrates could be bonded together in a cycle time of 10 seconds using a low capacity UV irradiation device where electric power consumption was 1 kW.

In this example, a very intense flash was generated from the xenon lamp during irradiation. However, this flash did not melt the aluminum sputtered layer provided on the disc substrate.

Example 2

In this example, an aluminum sputtered coating which has a transmissivity rate of around 0.5% at a wavelength of 365 nm was employed, with 3 of the long cylindrical xenon lamps (manufactured by Ushio Inc.) from Example 1 used. While not shown in the figures, in this example, the lamps were disposed in parallel at intervals of about 3 cm so that UV irradiation could be carried out almost uniformly across the entire surface of the disc substrate. The distance from the center of lamp 10 to the disc surface was about 30 mm.

Supplementary electrodes 19 were provided in the form of conducting wires wrapped several times around the length of each of lamps 10. The left and right electrodes and the supplementary electrode of lamp 10 are connected to a flash-type discharge mechanism.

Figure 4:
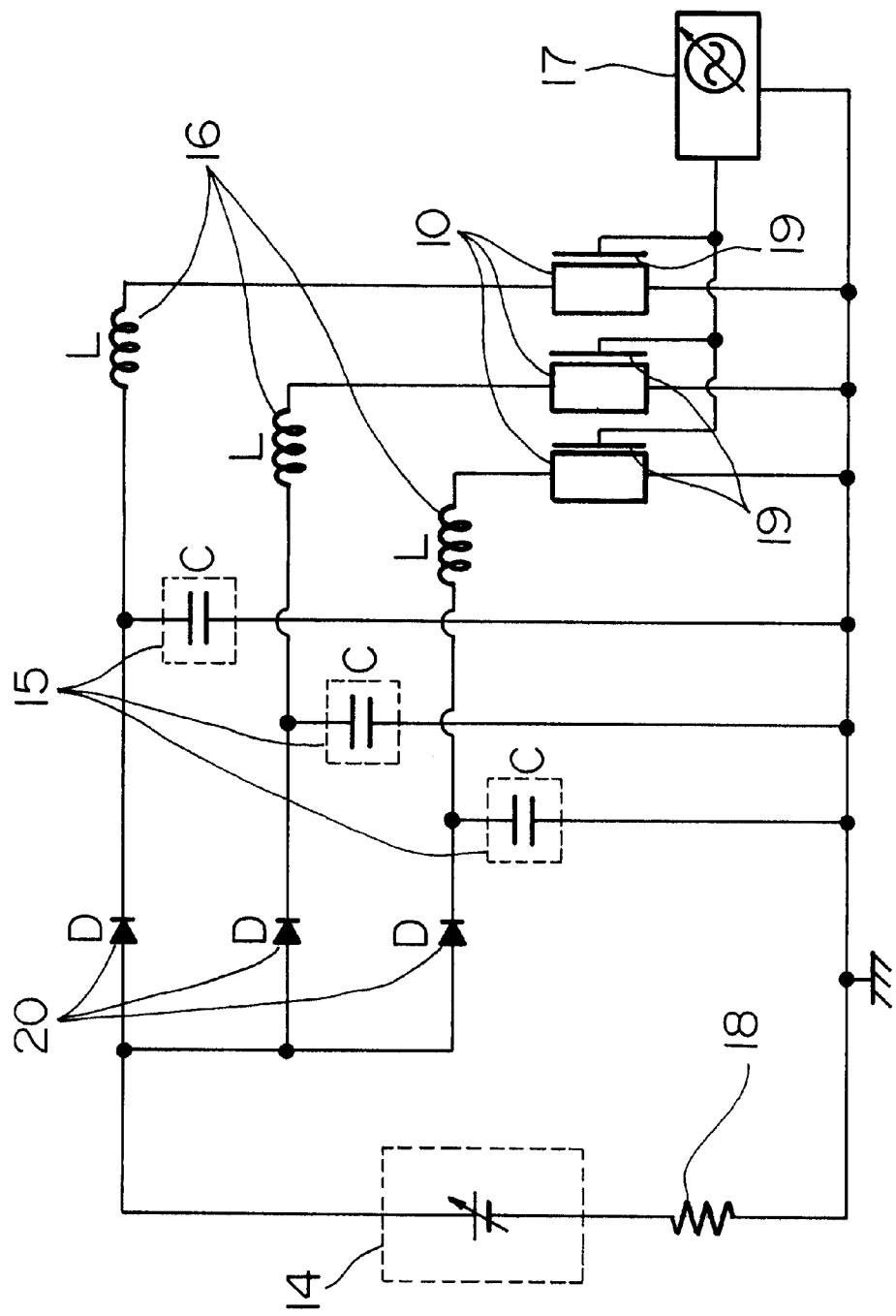
FIG. 4 is a schematic figure showing the power circuit for the synchronous generation of light from 3 xenon lamps.

FIG. 4 shows the mechanism for synchronizing the flashing of the three xenon lamps. The part for switching the capacitor C for charging is omitted from the figure. The circuit in FIG. 4 has a construction wherein basic power circuits (one of which is shown in FIG. 3) which are as numerous as the number of lamps, are provided in parallel. When generating light from each lamp, the connection between the high voltage side of capacitor 5 and the positive electrode of direct current power source 14 is carried out via a diode 20 so that the charge in capacitor 15 which is connected in series to each of the lamps does not flow to the other lamps. The synchronization of light flashes from each of the lamps can be carried out by supplying the trigger outputs from equivalent trigger generating circuits in parallel to the supplementary electrodes which are wrapped around each of the lamps.

By setting the reactance L of the air coil to 30 $\mu$H, the charging voltage to 1.8 kV, the capacitance to 300 $\mu$F, and the repeating speed of the flash discharge to 1 cycle/sec, uncured layer 7 could be completely cured under UV irradiation for 7 seconds.

The energy used in this case was 10.2 kWs (10,200 joules). In order to obtain about the same degree of curing using the conventional continuous irradiating-type UV irradiation device, it is necessary, for example, to employ a metal halide lamp with an installation capacity of 3 kW, with the disc substrates placed on a conveyor and passed under the lamp at a distance at which the disc substrates will not be deformed due to heating by the lamp. About 40 seconds are required in this case, with 120 kWs (120,000 joules) of energy being consumed. In other words, as compared to continuous UV irradiation, a flash-type irradiation enables two disc substrates to be bonded together with less energy consumed.

When bonding disc substrates to form an SD-5 (DVD-5) type disc with the above described equipment, uncured layer 7 can be cured in just a single irradiation cycle when UV is irradiated from the side of the transparent disc substrate.

The discharge energy per cycle calculated under the aforementioned conditions was 486 J, while the peak value of the waveform of the discharge current was about 1,050 A. The one-third-falling duration was about 0.4 msec. Under these conditions, the power consumed in terms of power capacity did not even amount to 2 kW, even when taking the voltage conversion efficiency and the power factor of the electric circuit system into consideration.

In the above described embodiment, two disc substrates could be bonded together in a cycle time of less than 10 seconds using a low capacity UV irradiation device where electric power consumption was 2 kW.

In this example, a very intense flash was generated from the xenon lamp during irradiation. However, this flash did not melt the aluminum sputtered layer provided on the disc substrate.

Based on the present inventors' discovery, it is hypothesized that the progression of the curing reaction of a UV curable resin under UV light which passes through a thin metallic coating is not determined simply by the total energy required in the irradiation. Rather, it is believed that the progression of the curing reaction is probably closely related to the waveform of the discharge current, and more precisely, to the one-third-falling duration, and to changes in the emission spectrum which is thought to varying with the waveform of the discharge current.

When applying the present invention to a bonding process in a production line, it is preferable to employ a device which includes a mechanism for suitably adjusting the one-third-falling duration of the discharge current flowing to the lamp and the speed of repetition of light flashes, with the circuit constants of the discharge circuit suitably adjusted according to the light transmissive characteristics of each of the disc substrates. In this way, the application of the present invention under optimal conditions can be realized.

In a bonding method which employs a flash-type lamp device which can repeatedly generate light, wherein the light-emitting region of the lamp employed as the light source conforms well with the transmission spectrum of the aluminum reflective coating which is formed to the information recording surface of the DVD, for example, and an intense light is obtained instantly, it is possible to cure a bonding agent consisting of a UV curable composition within a short period of time, even if the device has a low power capacity of around 2 kW.

What is claimed:

1. A method for bonding together two disc substrates comprising:
   providing a device having
     a light emission device which includes a UV light source lamp and a flashing discharge mechanism which can carry out a single or repeating emission;
     a means for blocking infrared light in the light from the light source when carrying out flashing UV irradiation; and at least one UV transmissive disc holding member with a surface roughness of Rmax≦1 μm and a profile irregularity of 7 λ;

loading said device with two disc substrates to be bonded, each said disc substrate has a UV transmissive base, at least one said disc substrate having a UV transmissive-visible light reflective information recording layer provided on the UV transmissive base;

using a bonding agent containing a UV curable composition between the disc substrates, wherein the information recording layer of one disc substrate faces the other disc substrate; and curing the bonding agent by UV irradiation, wherein the bonding agent is cured by a single or repeating flash of UV light so as not to impair the information recording surface, with the energy consumed being less and the irradiation time being shorter than is required in the case of curing a UV curable composition using a continuous emission of UV light.

2. A method according to claim 1 wherein UV is irradiated in synchronized flashes from the sides of the UV transmissive bases of each of the two disc substrates.

3. A method according to claim 1, wherein the UV curable composition includes a photopolymerization initiator, with the absorption wavelength of the photopolymerization initiator and the wavelength of the irradiated UV overlapping.

4. A method according to claim 1 wherein UV irradiation is carried out while blocking infrared.

5. A device for bonding together two disc substrates, each of which has a UV transmissive base consisting of a synthetic resin, by curing the bonding agent by flash irradiation of UV light, at least one of said disc substrates having a UV transmissive-visible light reflective information recording layer provided on the UV transmissive base, a bonding agent containing a UV curable composition coated between two said disc substrates, said UV curable composition comprising a radical polymerizable monomer, the information recording layer facing the opposing said disc substrate, said device comprising: a light emission device which includes a UV light source lamp and a flashing discharge mechanism which can carry out a single or repeating emission, a means for blocking infrared light in the light from the light source when carrying out flashing UV irradiation, and at least one UV transmissive disc holding member with a surface roughness of Rmax≦1 μm and a profile irregularity of 7 λ.

6. A device according to claim 5, wherein UV light source lamps are directed toward opposite sides of the two disc substrates combined, and a mechanism is provided for synchronizing the irradiation of UV flashes from each of the lamps.

7. A device according to claim 5, wherein the peak value and time duration of the discharge current flowing to the lamp, and the repeat speed for lamp emission can be suitably adjusted.

8. A device according to claim 5 wherein an infrared filter is provided between the lamp and the disc substrate.

9. A device according to claim 5, wherein a mechanism is provided for discharging an electric energy stored in a capacitor for a time on the order of microseconds to milliseconds.

10. A device according to claim 5, wherein the UV transmissive disc holding member is made of quartz glass.

11. A device according to claim 5, wherein UV light source lamps are set up to both sides of two combined disc substrates without directly contacting the substrates, and irradiate both sides of said disc substrates.

12. In combination, two disc substrates and a device for bonding together said two disc substrates by curing the bonding agent by an irradiation of UV flashes comprising:

two disc substrates each of which has a UV transmissive base consisting of a synthetic resin, at least one said disc substrate having a UV transmissive-visible light reflective information recording layer provided on the UV transmissive base, a bonding agent containing a UV curable composition comprising a radical polymerizable monomer, coated between two said disc substrates, an information recording layer facing the opposing said disc substrates, a light emission device which includes a UV light source lamp and a flashing discharge mechanism which can carry out single or repeating emission, a means for blocking infrared light in the light from the light source when carrying out flashing UV irradiation; and at least one UV transmissive disc holding member with a surface roughness of Rmax≦1 μm and profile irregularity of 7 λ.

13. Two disc substrates and a device according to claim 12, wherein all the disc substrates have a UV transmissive-visible light reflective information recording layer provided on a UV transmissive base.

14. Two disc substrates and a device according to claim 12, wherein UV light source lamps are directed toward opposite sides of the two disc substrates combined, and a mechanism is provided for synchronizing the irradiation of UV flashes from each of the lamps.

15. Two disc substrates and a device according to claim 12, wherein a mechanism is provided for adjusting the peak value and time duration of the discharge current flowing to the lamp, and the repeat speed for lamp emission.

16. Two disc substrates and a device according to claim 12, wherein an infrared filter is provided between the lamp and the disc substrate.

17. Two disc substrates and a device according to claim 12, wherein said UV transmissive base has a thickness of 0.3 to 1 mm.

18. Two disc substrates and a device according to claim 12, wherein a mechanism is provided for discharging an electric energy stored in a capacitor for a time on the order of microseconds to milliseconds.

19. A device according to claim 12, wherein the UV transmissive disc holding member is made of quartz glass.

20. Two disc substrates and a device according to claim 12, wherein UV light source lamps are set up to both sides of two combined disc substrates without directly contacting the substrates, and irradiate both sides of said disc substrates.

* * * * *